(12) United States Patent
Kirwan et al.

(10) Patent No.: US 7,925,747 B2
(45) Date of Patent: Apr. 12, 2011

(54) SYSTEM AND METHOD FOR SHARING WEB PERFORMANCE MONITORING DATA

(75) Inventors: Peter Kirwan, San Diego, CA (US); Rares Saftoiu, San Diego, CA (US); Lenny Rachitsky, Solana Beach, CA (US); Tim Drees, Del Mar, CA (US); Brian Kwok-Leung Tsui, San Diego, CA (US)

(73) Assignee: NeuStar, Inc., Sterling, VA (US)

(*) Notice: Subject to any disclaimer, the term of this patent is extended or adjusted under 35 U.S.C. 154(b) by 356 days.

(21) Appl. No.: 12/253,652

(22) Filed: Oct. 17, 2008

(65) Prior Publication Data
US 2009/0106390 A1 Apr. 23, 2009

Related U.S. Application Data

(60) Provisional application No. 60/981,063, filed on Oct. 18, 2007.

(51) Int. Cl.
*G06F 15/173* (2006.01)
(52) U.S. Cl. ........ 709/224; 709/217; 709/223; 713/152; 713/155; 713/161; 713/176
(58) Field of Classification Search .......... 709/117, 709/223, 224, 217, 21; 713/152, 155, 161, 713/171, 176; 726/2, 4, 17, 21, 26
See application file for complete search history.

(56) References Cited

U.S. PATENT DOCUMENTS

| | | | |
|---|---|---|---|
| 6,957,199 B1 * | 10/2005 | Fisher | 705/78 |
| 7,290,129 B2 * | 10/2007 | Chebolu et al. | 713/150 |
| 7,546,368 B2 * | 6/2009 | Drees et al. | 709/224 |
| 7,577,995 B2 * | 8/2009 | Chebolu et al. | 726/26 |
| 7,681,242 B2 * | 3/2010 | Green et al. | 726/27 |
| 2003/0115151 A1 * | 6/2003 | Wheeler et al. | 705/64 |
| 2006/0271695 A1 * | 11/2006 | Lavian | 709/229 |
| 2008/0047009 A1 * | 2/2008 | Overcash et al. | 726/23 |

FOREIGN PATENT DOCUMENTS

| | | |
|---|---|---|
| JP | 1998124428 | 5/1998 |
| KR | 1020000017873 | 4/2000 |
| KR | 1020020011621 | 2/2002 |
| KR | 1020040074537 | 8/2004 |

OTHER PUBLICATIONS

International Search Report and Written Opinion for PCT/US08/080348 dated Jun. 29, 2009.

\* cited by examiner

*Primary Examiner* — Krisna Lim
(74) *Attorney, Agent, or Firm* — Pattric J. Rawlins; Procopio Cory Hargreaves & Savitch LLP

(57) ABSTRACT

A monitoring system is provided that allows owners of monitoring accounts to share web monitoring data collected under the direction of the monitoring account. Account owners are able to interact with the monitoring system to identify recipient accounts for shared web monitoring data and apply permissions at a granular level so that portions of monitored data can be shared with varying permission levels. Grouping can also be employed by an account owner to facilitate efficient sharing of monitoring data to many recipient accounts. The monitoring system also provides analysis utilities that can be used by a recipient account to aggregate shared with owned data and generate related reports as desired.

16 Claims, 8 Drawing Sheets

Data Recipient Account 3100

| Monitoring Module | Shared Data Type | Shared? | Security Level |
|---|---|---|---|
| Monitoring Module 20010 | Collected Monitoring Data 40010 | Yes | Level 1 |
| | Data Collection Parameters 40020 | Yes | Level 1 |
| | Administrative Data 40030 | Yes | Level 2 |
| | Other Data 40040 | Yes | Level N |
| Monitoring Module 20020 | Collected Monitoring Data 40050 | No | Level 2 |
| | Data Collection Parameters 40060 | Yes | Level 3 |
| | Administrative Data 40070 | Yes | Level 2 |
| | Other Data 40080 | No | Level N |
| ... | ... | ... | ... |
| Monitoring Module 200x0 | Collected Monitoring Data 400x0 | Yes | Level 3 |
| | Data Collection Parameters 400x0 | No | Level 1 |
| | Administrative Data 400x0 | Yes | Level 2 |
| | Other Data 400x0 | No | Level N |

Data Recipient Account 3101

| Monitoring Module | Shared Data Type | Shared? | Security Level |
|---|---|---|---|
| Monitoring Module 20110 | Collected Monitoring Data 40110 | Yes | Level 1 |
| | Data Collection Parameters 40120 | Yes | Level 1 |
| | Administrative Data 40130 | Yes | Level 2 |
| | Other Data 40140 | Yes | Level N |
| Monitoring Module 20120 | Collected Monitoring Data 40150 | No | Level 2 |
| | Data Collection Parameters 40160 | Yes | Level 3 |
| | Administrative Data 40170 | Yes | Level 2 |
| | Other Data 40180 | No | Level N |
| ... | ... | ... | ... |
| Monitoring Module 201x0 | Collected Monitoring Data 401x0 | Yes | Level 3 |
| | Data Collection Parameters 401x0 | No | Level 1 |
| | Administrative Data 401x0 | Yes | Level 2 |
| | Other Data 401x0 | No | Level N |

...

Data Recipient 31xx

| Monitoring Module | Shared Data Type | Shared? | Security Level |
|---|---|---|---|
| Monitoring Module 21010 | Collected Monitoring Data 41010 | Yes | Level 1 |
| | Data Collection Parameters 41020 | Yes | Level 1 |
| | Administrative Data 41030 | Yes | Level 2 |
| | Other Data 41040 | Yes | Level N |
| Monitoring Module 21020 | Collected Monitoring Data 41050 | No | Level 2 |
| | Data Collection Parameters 41060 | Yes | Level 3 |
| | Administrative Data 41070 | Yes | Level 2 |
| | Other Data 41080 | No | Level N |
| ... | ... | ... | ... |
| Monitoring Module 21xx0 | Collected Monitoring Data 41xx0 | Yes | Level 3 |
| | Data Collection Parameters 41xx0 | No | Level 1 |
| | Administrative Data 41xx0 | Yes | Level 2 |
| | Other Data 41xx0 | No | Level N |

FIG. 6

| Data Provider Account 3000 | | | |
|---|---|---|---|
| Monitoring Module | Shared Data Type | Shared? | Security Level |
| Monitoring Module 2001 | Collected Monitoring Data 4001 | Yes | Level 1 |
| | Data Collection Parameters 4002 | Yes | Level 1 |
| | Administrative Data 4003 | Yes | Level 2 |
| | Other Data 4004 | Yes | Level N |
| Monitoring Module 2002 | Collected Monitoring Data 4005 | No | Level 2 |
| | Data Collection Parameters 4006 | Yes | Level 3 |
| | Administrative Data 4007 | Yes | Level 2 |
| | Other Data 4008 | No | Level N |
| ... | ... | ... | ... |
| Monitoring Module 200x | Collected Monitoring Data 400x | Yes | Level 3 |
| | Data Collection Parameters 400x | No | Level 1 |
| | Administrative Data 400x | Yes | Level 2 |
| | Other Data 400x | No | Level N |

| Data Provider Account 3001 | | | |
|---|---|---|---|
| Monitoring Module | Shared Data Type | Shared? | Security Level |
| Monitoring Module 2011 | Collected Monitoring Data 4011 | Yes | Level 1 |
| | Data Collection Parameters 4012 | Yes | Level 1 |
| | Administrative Data 4013 | Yes | Level 2 |
| | Other Data 4014 | Yes | Level N |
| Monitoring Module 2012 | Collected Monitoring Data 4015 | No | Level 2 |
| | Data Collection Parameters 4016 | Yes | Level 3 |
| | Administrative Data 4017 | Yes | Level 2 |
| | Other Data 4018 | No | Level N |
| ... | ... | ... | ... |
| Monitoring Module 201x | Collected Monitoring Data 401x | Yes | Level 3 |
| | Data Collection Parameters 401x | No | Level 1 |
| | Administrative Data 401x | Yes | Level 2 |
| | Other Data 401x | No | Level N |

...

| Data Provider Account 30xx | | | |
|---|---|---|---|
| Monitoring Module | Shared Data Type | Shared? | Security Level |
| Monitoring Module 2101 | Collected Monitoring Data 4101 | Yes | Level 1 |
| | Data Collection Parameters 4102 | Yes | Level 1 |
| | Administrative Data 4103 | Yes | Level 2 |
| | Other Data 4104 | Yes | Level N |
| Monitoring Module 2102 | Collected Monitoring Data 4105 | No | Level 2 |
| | Data Collection Parameters 4106 | Yes | Level 3 |
| | Administrative Data 4107 | Yes | Level 2 |
| | Other Data 4108 | No | Level N |
| ... | ... | ... | ... |
| Monitoring Module 21xx | Collected Monitoring Data 41xx | Yes | Level 3 |
| | Data Collection Parameters 41xx | No | Level 1 |
| | Administrative Data 41xx | Yes | Level 2 |
| | Other Data 41xx | No | Level N |

FIG. 7

SYSTEM AND METHOD FOR SHARING WEB PERFORMANCE MONITORING DATA

RELATED APPLICATION

The present application claims priority to U.S. provisional patent application Ser. No. 60/981,063 filed Oct. 18, 2007, which is incorporated herein by reference in its entirety.

BACKGROUND

1. Field of the Invention

The present invention is generally related to website monitoring and more specifically related to selectively sharing data obtained from performing such monitoring.

2. Related Art

In the current state of the art of web performance monitoring, parties interested in monitoring a particular website, web application, web service, web API, or in general monitoring a target, setup an account with a provider of such monitoring services in order to obtain the desired data. Owners of these accounts monitor one or more targets through the service provider regardless of whether another account owner is already monitoring the same target. This results in significant redundant monitoring and generates data with various degrees of accuracy for the same target, giving rise to the problem of which set of data is truly accurate and valid.

Currently, there are two different well-known ways to share web performance monitoring data. One possibility is to give another interested party access to an owner's monitoring account by providing the interested party with certain login information such as a user name and password ("credentials") for the owner's account. Another possibility is to give the interested party one or more reports of the collected monitoring data.

In the former case, a high degree of trust must be present between the parties sharing the data, since the recipient of the credentials will have full access to the owner's accounts. The high degree of trust requirement makes this method unsuitable for most situations.

In the latter case, reports are limited in the sense that they lack the analysis tools usually provided with monitoring accounts. Moreover, creating an integrated report one party's monitoring data combined with the other party's monitoring data becomes tedious, as two different data sources need to be reconciled in order for both sets of data to be viewed, examined, and correlated into one or more reports.

Therefore, what is needed is a system and method that overcomes these significant problems found in the conventional systems as described above.

SUMMARY

Accordingly, described herein is are systems and methods that address the aforementioned issues by allowing owners of monitoring accounts to: (1) share monitoring data with one another seamlessly and securely, providing interested parties with access to desired monitoring data and data analysis tools; and (2) use a flexible organization and security mechanism to selectively specify the data to be shared and the authorized recipients.

A web performance monitoring system allows a web monitoring account that has used the services of the web performance monitoring system to collect a variety of monitoring data to share that collected data with another web monitoring account even though the two web monitoring accounts are not owned by the same individual or organization.

The owner account is enabled to provide data access to a recipient account even though the accounts are completely independent in terms of data collection parameters, collected monitoring data, and rights to view the collected data and view and/or modify the data collection parameters. The owner account is able to identify a recipient account that will be granted access to certain monitoring data collected on behalf of the owner account; identify what monitoring data or portion thereof is to be shared to each recipient account; assign certain permissions to the monitoring data or portion thereof. The monitoring system attends to the delivery of the monitoring data shared with the recipient account by the owner account.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 6 is a block diagram illustrating the data owner account's view of the recipient accounts it has shared data with.

FIG. 7 is a block diagram illustrating the recipient account's view of the owner accounts that have shared data with it.

DETAILED DESCRIPTION

Certain embodiments as disclosed herein provide for a web performance monitoring system that enables sharing of web performance monitoring data collected by the system between the various accounts maintained by the system. For example, one method as disclosed herein allows for an owner account to share a portion of the data collected on behalf of the owner account with a recipient account. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Specifically, one embodiment described herein is designed to function in the web monitoring industry and the operating environment set forth herein. It should be understood that alternative embodiments may also be deployed in different industries, for example in collaborative research systems, homeland security and other data rich industries where information is collected and can be shared amongst different entities.

Figure 1:
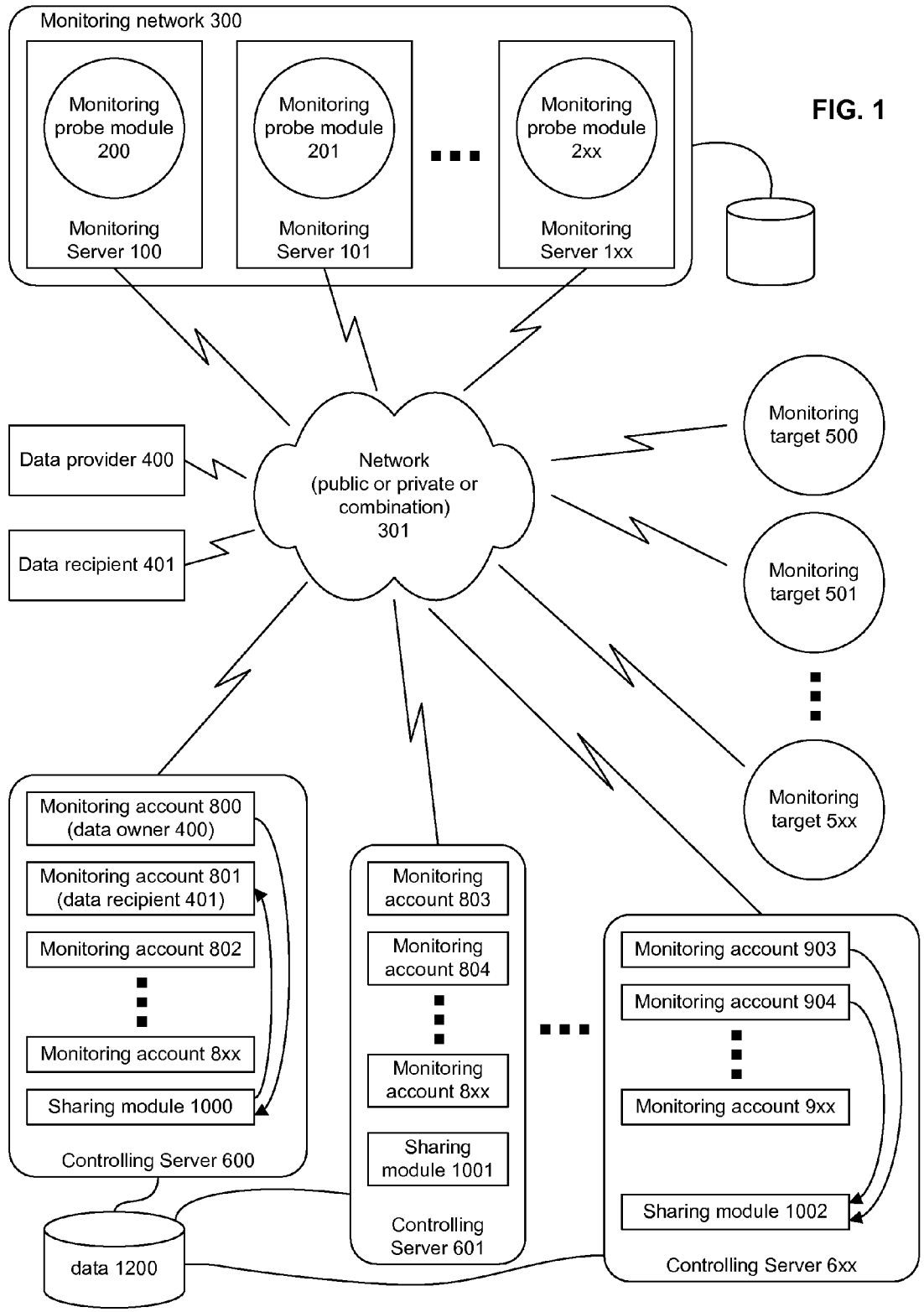
FIG. 1 is a network diagram illustrating an example web performance monitoring data sharing system according to an embodiment of the present invention.

FIG. 1 is a network diagram illustrating an example web performance monitoring data sharing system according to an embodiment of the present invention. The monitoring system which collects the website uptime and performance data comprises three major components: a network composed of servers 100-1xx (referred to as the Monitoring Network 300), which each contain a Monitoring Probe Module (200-2xx). The Monitoring Probe Modules connect to the Monitoring Targets 500-5xx to collect the monitoring data. A repository 1200 stores the collected monitoring data as well as other information, including but not limited to, the data collection parameters. The monitoring system also comprises one or more servers referred to as Controlling Servers 600-6xx) which act as intermediaries between the Monitoring Network 300 and the data repository 1200.

Additional details and information regarding the monitoring system is described by Applicant in its prior filed U.S. patent application Ser. No. 12/163,659 filed 27 Jun. 2008 and U.S. patent application Ser. No. 11/142,889 filed 1 Jun. 2005 and issued as U.S. Pat. No. 7,770,068, each of which is incorporated herein by reference in its entirety.

Figure 2:
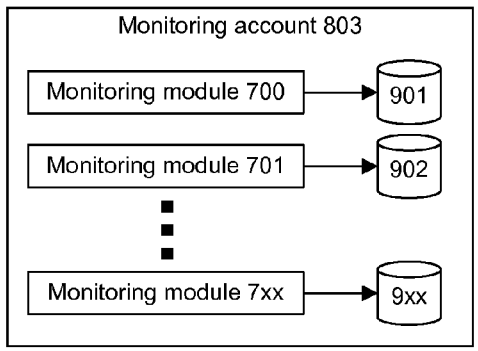
FIG. 2 is a block diagram illustrating a web performance monitoring account, according to an embodiment of the present invention.

FIG. 2 is a block diagram illustrating a web performance monitoring account 803 according to an embodiment of the present invention. The web performance monitoring account 803, is a collection of monitoring modules 700-7xx. An account 803 can store a multiple number of monitoring modules 700-7xx, as well as additional information those modules have in common. The account 803 allows access to monitoring modules 700-7xx, their data 900-9xx, as well as to a collection of tools used to analyze, correlate, and provide reports on the data. The monitoring system can contain a large number of such accounts.

Figure 3:
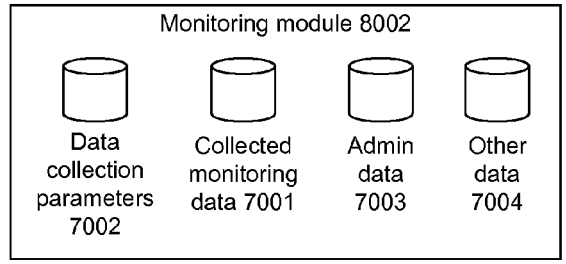
FIG. 3 is a block diagram illustrating a web performance monitoring module, according to an embodiment of the present invention.

FIG. 3 is a block diagram illustrating a web performance monitoring module 8002, according to an embodiment of the present invention. The parameters 7002 for collecting the monitoring data as well as the collected monitoring data 7001 itself, along with other data 7004 (such as the information of the person to be contacted in case a monitoring probe, e.g. 200, detects a problem with a monitoring target, e.g. 500,) are stored in an associated fashion by a web performance monitoring module, or monitoring module 8002 for short. Each account can contain a large number of such monitoring modules.

In one embodiment, the web performance monitoring system includes a variety of modules and tools that can be used by the various accounts for analyzing the collected monitoring data. These modules and tools include, but are not limited to, dash-boarding, graphing, viewing data collection logs, running diagnostics, etc.

Using the description above for FIGS. 1-3 as one embodiment in which the sharing of web monitoring data can be implemented, the following description of FIGS. 1-5 describe an operating environment and context for sharing of web monitoring data according to one embodiment.

Figure 4:
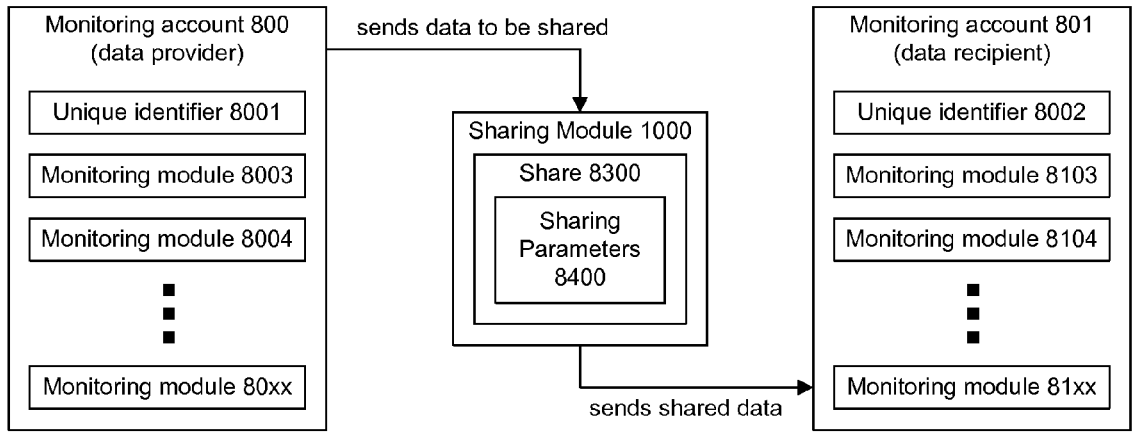
FIG. 4 is a block diagram illustrating data sharing as performed within a controlling server, according to an embodiment of the present invention.

Turning now to FIG. 4, a block diagram illustrating data sharing as performed within a controlling server is described according to an embodiment of the present invention. In the illustrated embodiment, what is shown is a system and a process for allowing a monitoring account 800 to provide data access to another monitoring account 801 via a sharing module 1000. This sharing is accomplished even though the accounts can, and often will be, completely independent in terms of data collection parameters, collected monitoring data, as well as rights to view and modify the data collection parameters. In the illustrated embodiment, the process comprises four steps that are collectively described in connection with FIGS. 1, 4, 5, 6, 7 and 8. Note that the various steps can occur in any order, although described in this particular sequence to illustrate an example of the sharing mechanism and process according to one embodiment.

Figure 5:
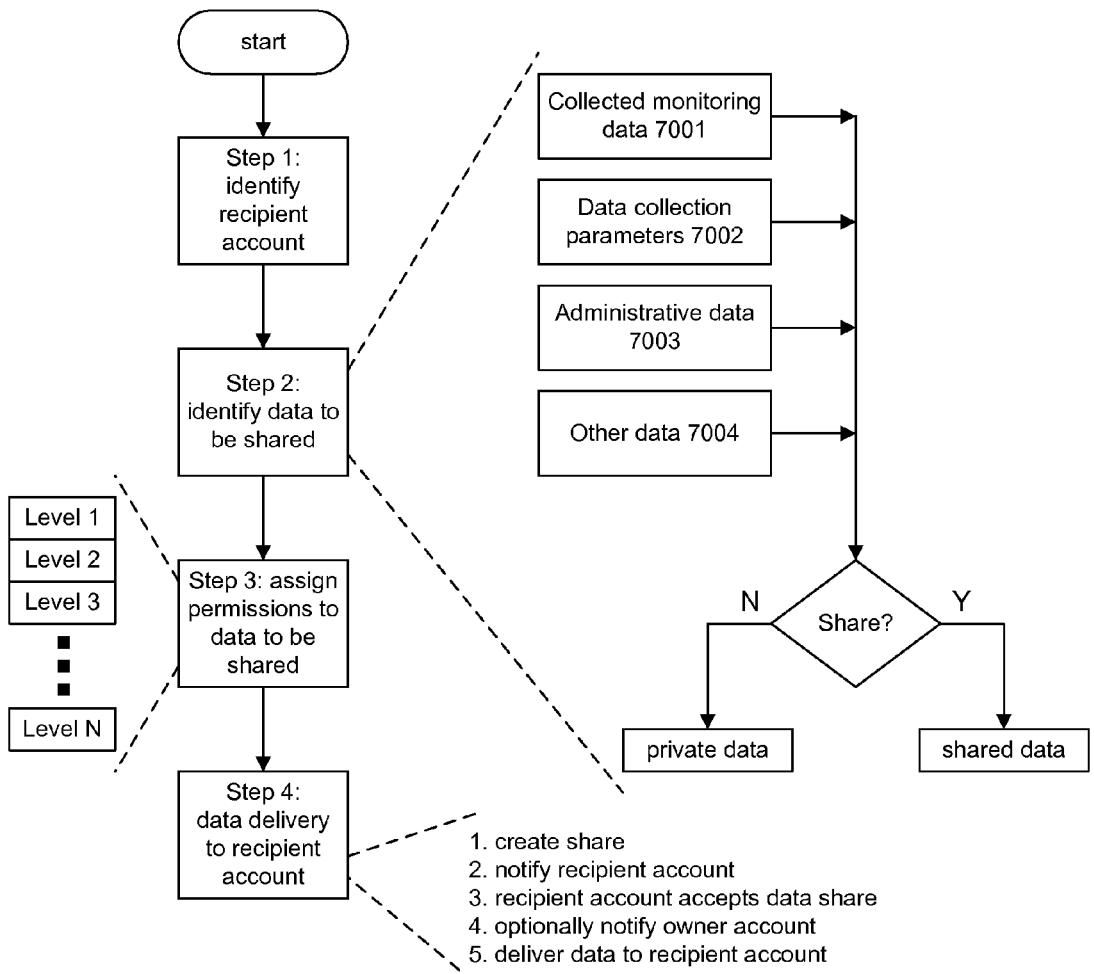
FIG. 5 is a flow diagram illustrating an example of the process of sharing website uptime and performance data between two monitoring accounts according to an embodiment of the present invention.

FIG. 5 is a flow diagram illustrating an example of the process of sharing website uptime and performance data between two monitoring accounts according to an embodiment of the present invention. In one embodiment, this process can be carried out by the web monitoring system previously described with respect to FIG. 1. In this description, the account that is providing the data access will be known as the data owner account 800, whereas the account that is receiving the data access will be known as the data recipient account 801.

Initially, in step 1 a recipient account to which web monitoring data will be shared is identified. In one embodiment, to identify a recipient account 801 to provide web monitoring data to, the data owner account 800 uses a unique identifier 8002 of the data recipient account 801. Accounts are uniquely defined in the system by a string of characters. This string of characters can comprise a randomly generated username, a selected username, an e-mail address, etc., and can include numbers, letters, and other characters. The string of characters may be referred to herein as a username. The easiest method of picking an account 801 to provide data access to is by providing the username of that account to the monitoring system. Referring briefly back to FIG. 4, the monitoring system is then able to associate the owner account 800 with the recipient account 801 and will establish a share 8300 between the two accounts.

Should the recipient account 801 not yet exist, the owner account 800 can provide an email address associated with intended data recipient 401 (FIG. 1) and the monitoring system sends out an email invitation to the specified email address. The invitation email provides instructions for the creation of the recipient account 801. Once the recipient account 801 is created, the share 8300 between the two accounts will be automatically created, and data sharing is allowed and may proceed.

Once the data share 8300 is created to provide a logical link between the data owner account and the data recipient account, the sharing parameters 8400 associated with that link are stored as part of the data share 8300 data structure. The sharing parameters 8400 specify the properties of the share, including but not limited to, what type of data is shared, how much data the recipient account 801 has access to, as well as the operations and tools the recipient account is allowed to perform on the data.

Figure 8:
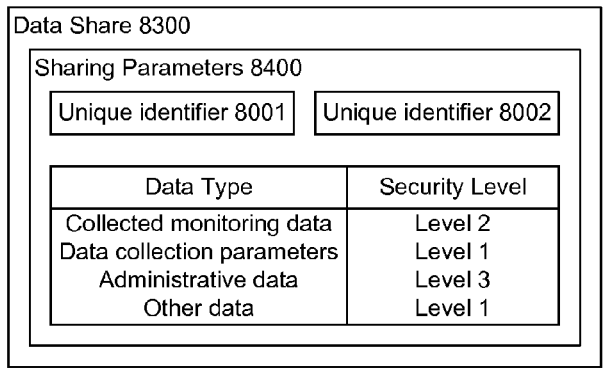
FIG. 8 is a block diagram detailing an example of a share between two accounts, as well as the sharing parameters associated with it, according to an embodiment of the present invention.

FIG. 8 is a block diagram detailing an example of a data share 8300 between two accounts, as well as the sharing parameters 8400 associated with the data share 8300, according to an embodiment of the present invention.

Referring back to FIG. 5, once the identify of the recipient account has been established, the data to be shared with the recipient account is identified, as shown in step 2. For example, once the data share 8300 between two accounts has been created, the next step is selecting the data that the owner account 800 will make available to the recipient account 801. In one embodiment, the data owner account 800 chooses a monitoring module 8002 to share with the data recipient account 801. Although it is possible for the data owner account 800 to choose multiple monitoring modules and configure sharing for them simultaneously, a single monitoring module is used in this example for simplicity.

The data contained by a monitoring module 8002 can be very diverse and depends on the data collection parameters 7002. One example breakdown of monitoring data is provided below. The description of the breakdown of data provided below is intended to serve only as an example of one embodiment and shall not serve to limit the invention to this particular type of breakdown. In the example embodiment, the data owner account 800 can choose all or a subset of the monitoring data to provide to the recipient account 801.

Data Collection Parameters 7002. The parameters specify how often a monitoring target 500 is to be examined by a monitoring probe 200, what the monitoring probe will record from the target, as well as what conditions constitute a problem or cause a monitoring entry related to the monitoring target. Common parameters include, but are not limited to, target status (e.g. online or offline), target load time, target DNS lookup time and target timeout thresholds. Additional parameters may also be used.

Collected Monitoring Data 7001. This is the data collected by a monitoring probe 200 while this particular monitoring module 8002 has been active, and can include recent monitoring data, as well as historical monitoring data, and is a record of whether or not the target has conformed to the data collection parameters 7002 each time it was examined by a monitoring probe 200.

Administrative Data 7003. This data may be needed by a monitoring probe 200 to authenticate itself to a monitoring target 500. An example includes probing a website which requires a set of credentials, such as a username and password, for access. If the probe must examine the site content which is protected, the probe must present a set of credentials to the target for authentication.

Other Data 7004. This includes other data that may be associated with the monitoring module 8002, including but not limited to, contact information in case the probe detects an error, as well as escalation procedures in case the error persists for a predetermined period of time.

Next, in step 3 permissions are assigned to the data. In one embodiment, once the data to be shared has been identified, the owner account 800 can specify the types of operations the recipient account 801 can perform on the data and the types of tools and utilities that the recipient account may use to interrogate the data.

Advantageously, the permissions scheme for specifying the types of operations the receiving account can perform on the data is flexible, providing customizable levels of security and access control. The flexibility of the scheme allows for the definition of multiple levels of security. For example, in one embodiment there may be security levels 1 through N, with each level providing greater access than the preceding level. In such an embodiment, increasing levels of security allow more operations to be performed on the data. The description of the security scheme provided below comprises three levels (1 through 3). This description is provided only as an example and is not intended to limit the number of security levels that can be supported by this scheme or the permissions flexibility of each level.

Level 1—Restricted Read Only. In this mode, the recipient account 801 is only allowed to see a portion of the data type that is being shared. One example restriction is limiting the amount of historical status of the collected monitoring data 7001 the recipient account 801 is allowed to view, e.g., from 1 year to 6 months. Another example would be to limit the viewing of the data collection parameters 7002 to only a subset of those parameters. Another example would be to allow access to the monitoring target load times but not to the monitoring target's DNS lookup times. Other limitations can also be employed.

Even with the limitations in place for level 1 security, the recipient account 801 is able to analyze the data via certain tools normally available for data analysis, including viewing graphs, viewing the current status, viewing the description of the service, dash-boarding, and other utilities in accordance with the functionality provided at level 1 security.

Level 2—Read Only Access. In this mode, the recipient account 801 is allowed to view all the collected data 7001, as well as the data collection parameters 7002, but is not allowed to modify the data collection parameters. Even with the limitations in place for level 2 security, the recipient account 801 is able to analyze the data via certain tools normally available for data analysis in accordance with the functionality provided at level 2 security.

Level 3—Full Access (Read/Write). In this mode, the recipient account 801 is allowed to work with the data in the same fashion as the owner account 800, including using the full suite of tools to perform analysis operations on the data as the owner account 800. For example, the recipient account 801 is able to view the collected data and analyze it using any of the tools provided with a monitoring account. At this security level, the recipient account is also allowed to view and modify the administrative data 7003.

Turning now to step 4 of FIG. 5, in this step the data is delivered to the recipient account 801. For example, once the owner account 800 has identified the data to be shared and associated a level of permissions with that data, the sharing module 8200 is notified. Next, the sharing module 8200 creates a share 8300. The Share 8300 contains sharing parameters 8400, which comprise a reference to the owner account 800 (in this case the unique username), a reference to the recipient account 801, a list of the type of data that has been shared, as well as the level of permissions associated with the shared data. An example share is illustrated in FIG. 8.

Once a share 8300 has been created and the parameters 8400 established, the recipient account 801 is notified by the monitoring system that new data is available for the recipient account 801. The recipient account 801 may or may not have the option to reject the shared data. Once the data has been delivered to the recipient account 801 (or otherwise made available to the recipient account 801), the tools normally used by the account 801 (such as graphing, reporting, etc) may be employed on the shared data, in accordance with the security level. In one embodiment, the shared data is visually and textually differentiated from the recipient account's own data to prevent confusion as to the ownership of the data. Additionally, the owner account 800 may optionally be notified of the successful creation of a share 8300 between the two accounts and whether or not the recipient account 801 accepted or rejected the shared data, if applicable.

Figure 9:
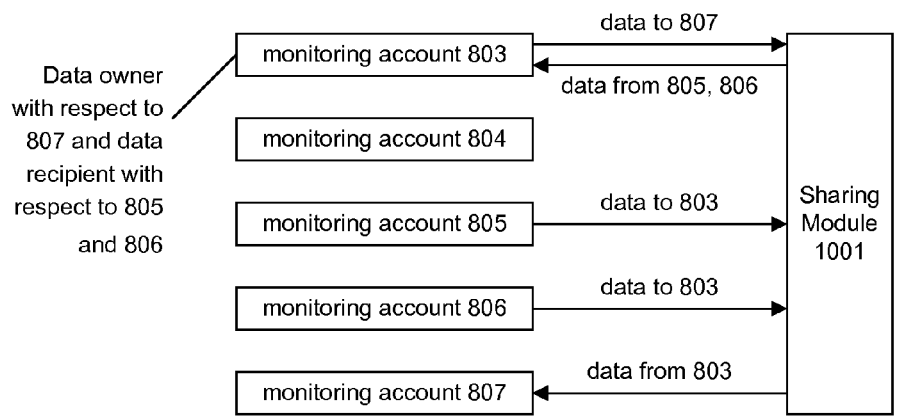
FIG. 9 is a block diagram illustrating a monitoring account that is acting as both a data owner and data recipient, according to an embodiment of the present invention.

With the shared data integrated into the recipient account's list of accessible monitoring data, the recipient account 801 can analyze and correlate the shared data with its own data, or with other shared data from other owner accounts. A recipient account 801 is able to receive data from multiple owner accounts 800, as well as able to send and receive data at the same time (e.g. a recipient account 801 can simultaneously be an owner account 800, and a owner account 800 can simultaneously be a recipient account 801, depending on the context). FIG. 9 is a block diagram illustrating a monitoring account that is acting as both a data owner and data recipient, according to an embodiment of the present invention.

Once the sharing process has been completed, the owner account 800 is able to view one or all of the recipient accounts 801 it has shared data with, including which monitoring modules have been shared, what type of data has been shared (e.g. collected data 7001, data collection parameters 7002, etc), and the permission levels associated with each recipient account. FIG. 6 is a block diagram illustrating the data owner account's view of the recipient accounts it has shared data with.

Once the sharing process has been completed, the recipient account 801 is able to view all of the owner accounts 800 it has received data from, as well as information about the data that has been shared, including the type of shared data and the permission levels granted by each owner account 800. FIG. 7 is a block diagram illustrating the recipient account's view of the owner accounts that have shared data with it.

Figures 10, 13:
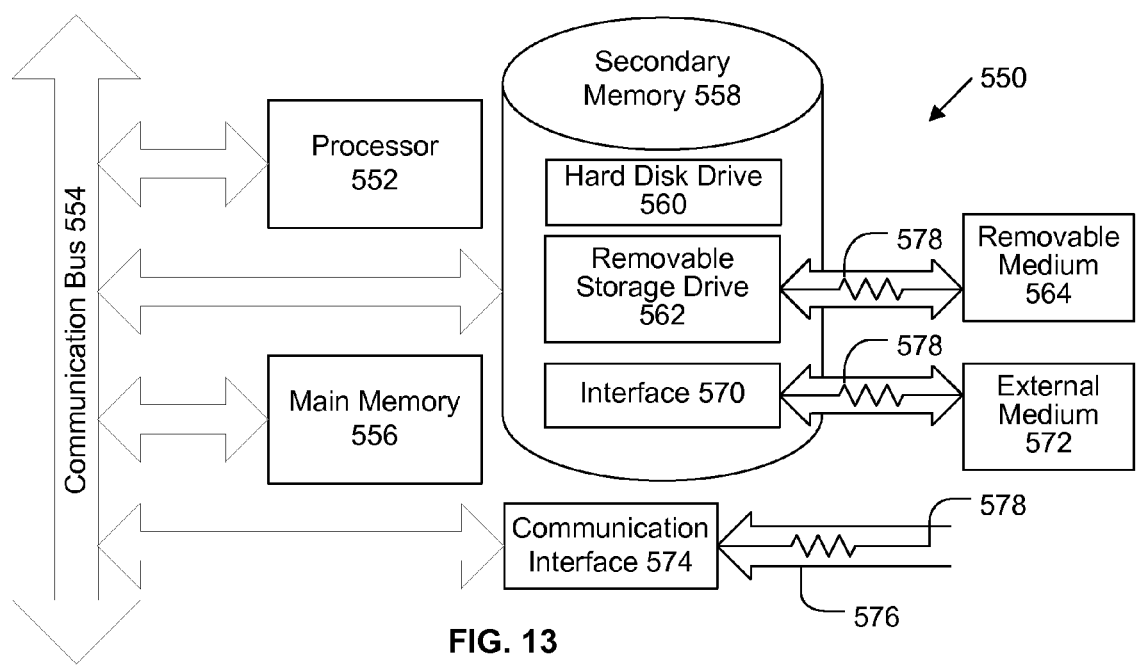
FIG. 10 is a block diagram illustrating the enumeration method for organizing data to be shared, according to an embodiment of the present invention.
FIG. 13 is a block diagram illustrating an example computer system that may be used in connection with various embodiments described herein.
Figure 11:
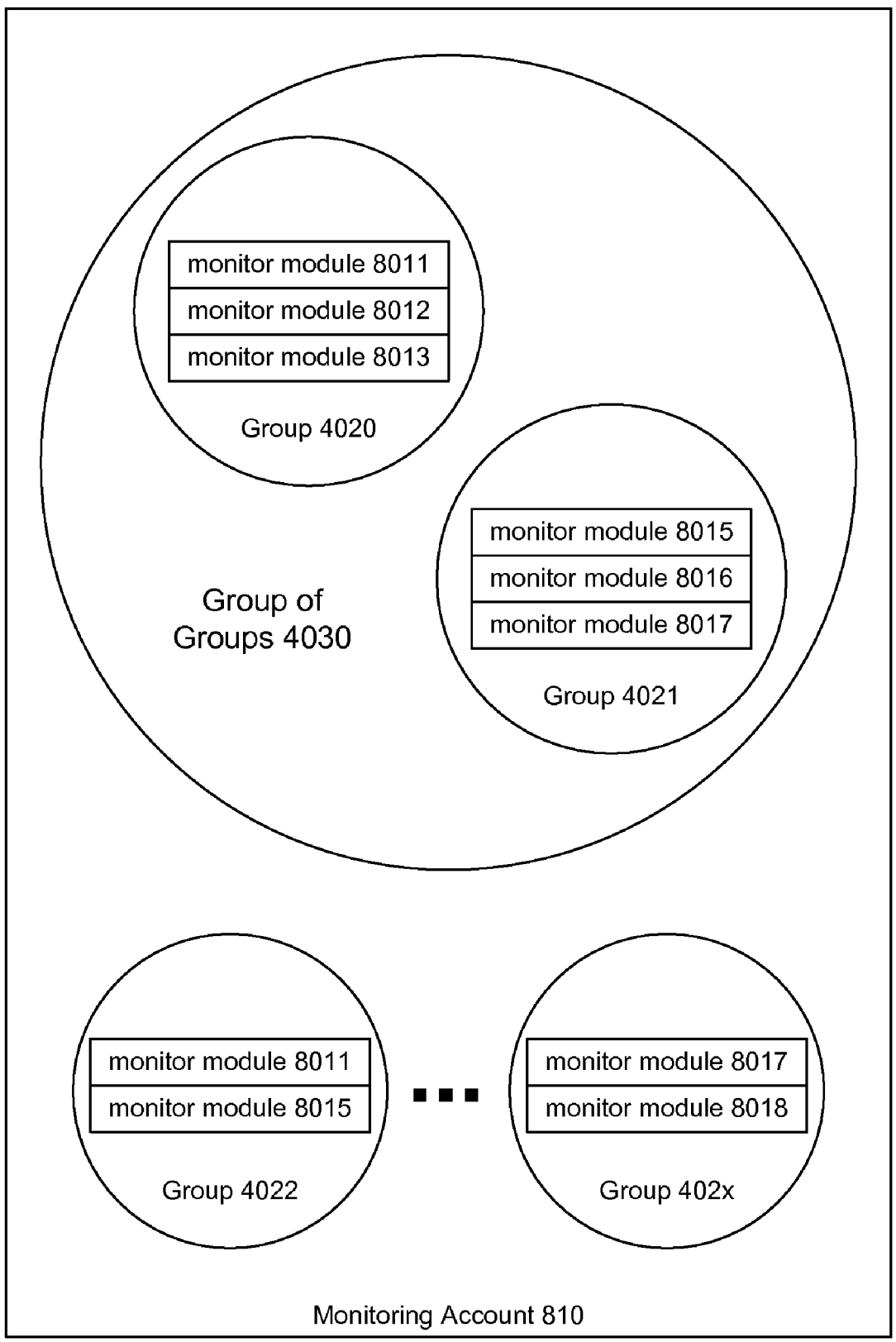
FIG. 11 is a block diagram illustrating the group method for organizing data to be shared, according to an embodiment of the present invention.
Figure 12:
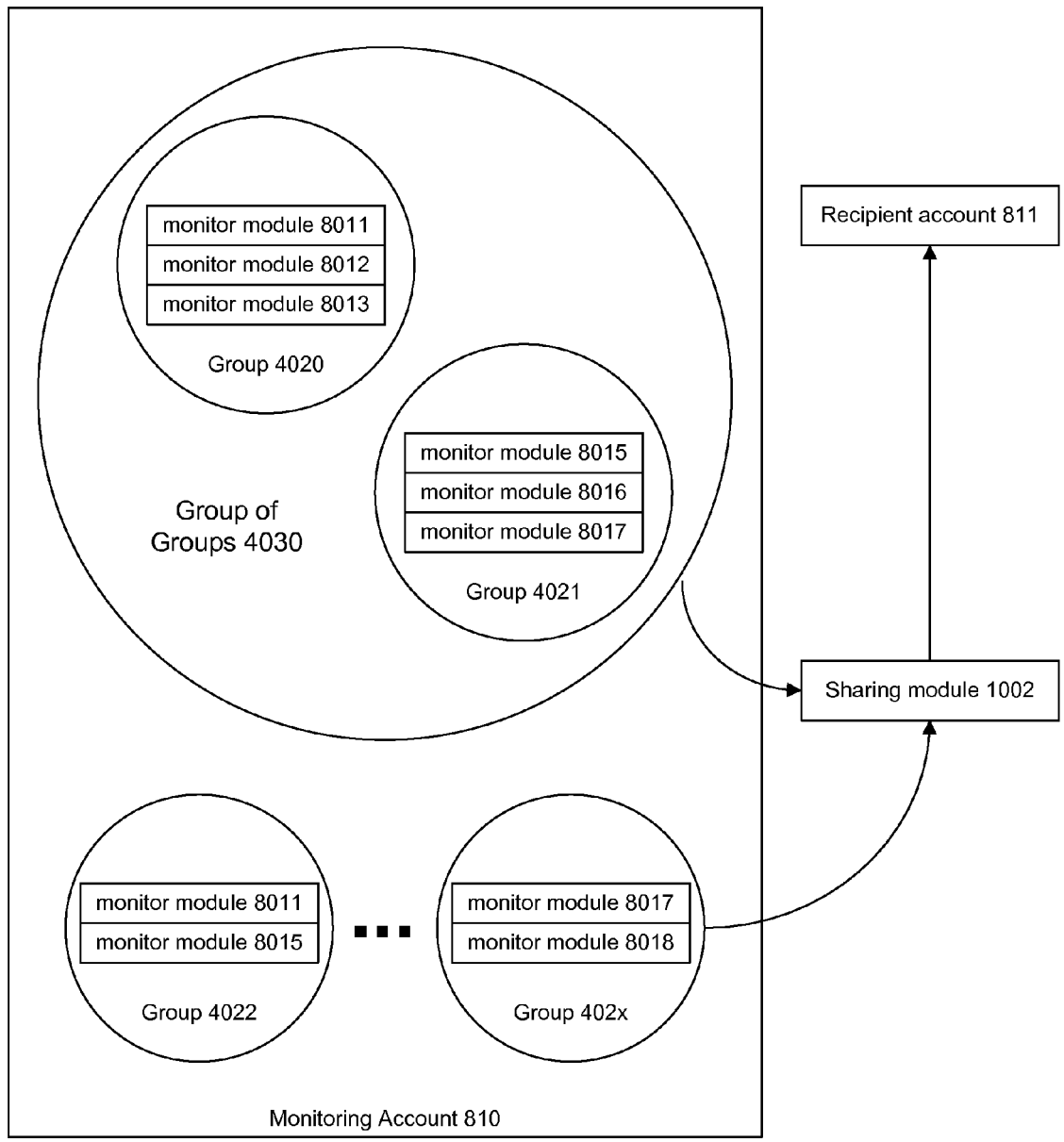
FIG. 12 is a block diagram illustrating sharing being performed within the group method for data organization, according to an embodiment of the present invention.

Turning now to FIGS. 10-12, a variety of relationship types between an owner account and a recipient account are contemplated. In one embodiment, the mechanism used to create a data share 8300 between an owner account and a recipient account can also be used to create data shares that are one to many. For example, one owner account 800 can provide data to multiple recipient accounts 801-8xx. Similarly, one recipient account 801 can be the recipient of data from multiple owner accounts 800. FIG. 9 is a block diagram illustrating a monitoring account that is simultaneously acting as both a data owner and data recipient, according to an embodiment of the present invention.

Additionally, in alternative embodiments, shared data can be organized in a variety of ways. For example, the data sharing process described above is an example of a data owner account 800 sharing the data from a single monitoring module with a single data recipient account 801. In one embodiment, sharing the data collected by multiple monitoring modules is accomplished by repeating the same sharing process described above for each monitoring module for which monitoring data is desired to be shared. However, this approach can be tedious and time consuming and labor intensive.

Accordingly, the monitoring system is configured to allow several alternative types of high volume organizational methods that each make the sharing of data easier to perform when a large number of accounts and monitoring modules are involved. In one embodiment, the methods described below can be employed as part of steps 2 and 3 that were previously described with respect to FIG. 5.

A first high volume technique is referred to as enumeration. FIG. 10 is a block diagram illustrating the enumeration method for organizing data to be shared, according to an embodiment of the present invention. The enumeration method is advantageously simple. Instead of the data owner account choosing only one monitoring module 8002 for which to configure the data sharing, the data owner account enumerates a list of such monitoring modules 8001-80xx. Once the list is complete, the data owner account chooses the type of data to be shared and permissions levels from the available options, and every monitoring module included in the list will be configured for sharing with the selected options.

The owner account can then select one recipient account, or also enumerate a list of recipient accounts 8100 to 81xx to share the data with. Once the list of recipient accounts is complete, the owner account shares all the monitoring modules identified in the list above with each of the recipient accounts in the enumerated list of recipient accounts.

A second high volume technique is referred to as groups. FIG. 11 is a block diagram illustrating the group method for organizing data to be shared, according to an embodiment of the present invention. In this embodiment, the monitoring system includes the ability to associate related monitoring modules into logical entities called groups of monitoring modules, or groups for short.

As shown in FIG. 11, the owner account 810 selects a list of monitoring modules 8011-801x and then groups them into one or more groups of modules 4020-402x. The owner account next selects the type of data to be shared and sharing permissions for the whole group. The group level permissions are then applied to every individual monitoring module in the group.

Next, the owner account selects a recipient account, and shares the whole group. When this option is used, the recipient account will receive access to every monitoring module in the shared group, as well as gain access to the monitoring modules in the same associated fashion, (e.g. as a group of modules), as the owner account.

FIG. 12 is a block diagram illustrating sharing being performed within the group method for data organization, according to an embodiment of the present invention. In the illustrated embodiment, a more encompassing organization concept is provided that includes a group of groups 4030. Similar to the way related monitoring modules are associated into a group as described above with respect to FIG. 11, desired groups of modules can also be associated into a group of groups. The owner account can also provide access to monitoring data at this level, sharing a whole group of groups with the recipient account.

Furthermore, the nesting of groups can be applied at multiple levels such that an owner account can define groups of groups of groups and beyond in order to simply and efficiently define sharable combinations of data from individual monitoring modules and simply and efficiently apply permissions to related groups.

Advantageously, because a hierarchy is created when grouping monitoring modules in this way, the monitoring system provides an inheritance mechanism that allows for the access control permissions to be inherited in accordance with the group hierarchy.

For example, the lowest level in the group hierarchy is defined as a group of monitoring modules 4020. A group of groups 4030 encompassing the group of modules is at the next higher level in the hierarchy, and a group encompassing group 4030 is at yet the next higher level, and so on. In this group hierarchy, a group in a higher level in the hierarchy can further restrict permissions of modules in a group lower in the hierarchy, but cannot be more permissive than a group lower in the hierarchy.

A third high volume technique is referred to as tagging or labeling. In one embodiment, a tag is a way of labeling a particular monitoring module. For example, a tag can be textual but other types of tags such as images, can be used to label a monitoring module. In tagging, an owner account selects a list of monitoring modules to share. The owner account then tags the monitoring modules with several keywords.

In a first example of sharing web based monitoring data using tagging, data shares are created for each monitoring module having a particular tag. Once the owner account has a list of tagged modules, the owner account identifies the monitoring modules to be shared by selecting the desired tag. Similarly, the type of permissions associated with the shared monitoring data can also be identified by selecting the desired tag. At this point, the monitoring system creates a separate data share as well as sharing parameters for each of the monitoring modules associated with the selected tag. Advantageously, this use of tags as an organizational tool allows the mass application of sharing settings to a list of tagged modules.

In a second example of sharing web based monitoring data using tagging, a data share is created for each individual tag. In this example, once the monitoring modules have been tagged, a single data share is created that includes all of the monitoring modules that as associated with the particular combination of tags designated by the owner account. Permissions can be similarly applied to this single share.

This is a very powerful mechanism because when additional monitoring modules are tagged, they automatically receive the sharing parameters of the tag, without the owner account having to individually select them for the data share.

EXAMPLE EMBODIMENTS

Example 1

A network based software application uses components distributed across a public or private network, components which may be provided by different parties. This network based application is referred to in this example as a mashup. For the purposes of this example, a hypothetical mashup called "Cold Call Assistant" is defined. The mashup uses software components provided by salesforce.com. For each sales lead, it gathers recent news near the geographic location of the prospect, news about the competition, provides a list of restaurants near the location of the prospect along with a map for directions, and the mashup provides the current weather in the geographic location of the prospect. Internally, it uses data from Google local search, Google finance, Google maps, Accuweather, Dapper, and Apatar.

The owner of the mashup would like to know when his/her visitors are having a bad experience. The owner would like to know how often each of the components used by the mashup has a problem. The provider of the mashup would like to track alternatives to the current components used in the mashup, to help identify potentially better performing components that may be used in the future. The provider of the mashup would also like to be able to show this performance monitoring information to the component providers and vendors, to prove when they are having problems.

In order to accomplish this, the mashup provider signs up for a web performance monitoring account (owner account) and employs performance monitoring modules for each of the components that the mashup uses, such as Google local search, Google finance, Google maps, Accuweather, Dapper, and Apatar. The mashup provider then obtains information about each component vendor's web performance monitoring accounts—either from the vendors themselves or by using their email addresses to initiate the data sharing process described above. Upon sharing the monitoring data with the various vendors, the vendors are then able to see the shared monitoring data the mashup owner account wants them to see. Accordingly, the component vendors are able to see, as provide by the mashup provider, when a component is having performance problems.

Example 2

A hypothetical large outsourced payment processor has a behind-the-firewall service oriented architecture ("SOA") process. One of the web service requests in the SOA transaction is to connect to an outside vendor, the US Post Office. As part of this connection, the processor sends the US Post Office its unique account credentials, security key and a data payload including general information about an employee's paycheck which the Post Office prints out and mails in an envelope. When the processor gets the positive response back from the Post Office that the check was mailed, the payment processor completes its SOA process and ends with a confirmation number.

a) the payment processor uses performance monitoring accounts and services, and has each step of the SOA process monitored as a part of a web service transaction service.

b) The Post Office also uses performance monitoring accounts, and they have their three step SOA process monitored which accepts the requests from customers and connects to the printer and envelope stuffer to complete the internal process.

c) The Post Office has shared a group status indicator for their complete SOA transaction with the Post Office, showing the operating status of a group of performance monitoring services.

d) The outsourced payment processor monitors the same basic functionality but in a different way—as a discrete transaction from the end user perspective.

e) The payment processor desires to associate its monitoring status with the Post Office's group-level monitoring status as a related monitor. In this way the processor can determine: (1) if a problem is reported by its performance monitoring service and a problem is reported by the Post Office performance monitoring service then the processor knows that the Post Office is aware of the problem and is hopefully already working on it; (2) if a warning is reported by the processor's performance monitoring service, and no problem is reported by the Post Office's monitoring service, the processor knows that most likely the problem is on the Post Office end, but they do not perceive it as a problem and are not actively working on it. This way the processor can notify the Post Office; and (3) if the processor sees a problem reported by the Post Office's monitoring service, and no warnings or problems are reported by its own monitoring service, the processor would know that most likely the Post Office is fine and is not working on any problem, and the processor may be the source of the problem. In this way the processor may need to undertake internal investigation.

In order to accomplish this, the processor asks the Post Office to initiate the process described above for sharing website uptime and performance data, and upon receipt of their shared data, the processor can accomplish everything stated in step (e) above.

FIG. 13 is a block diagram illustrating an example computer system 550 that may be used in connection with various embodiments described herein. For example, the computer system 550 may be used in conjunction with a monitoring server, controlling server, data owner, data repository, or monitoring target previously described with respect to FIG. 1.

However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A computer implemented method for sharing web monitoring data with a recipient account of a web monitoring service, the web monitoring data collected by the web monitoring service provider on behalf of an owner account of the web monitoring service, the method comprising:
  receiving from an owner account an identification of a recipient account for receiving shared web monitoring data;
  receiving from the owner account an identification of a portion of web monitoring data collected on behalf of the owner account, wherein the portion of the web monitoring data is to be shared with the identified recipient account;
  providing a share notice to the identified recipient account in response to receiving the identified recipient account and the identified portion of web monitoring data;
  receiving a share acceptance from the identified recipient account indicating acceptance of the identified portion of web monitoring data to be shared;
  updating a profile for the identified recipient account in the web monitoring service to authorize sharing of the identified portion of the web monitoring data from the owner account to the recipient account; and
  providing the identified portion of the web monitoring data to the identified recipient upon request.

2. The method of claim 1, further comprising receiving an identification of one or more permission levels for the portion of web monitoring data to be shared with the recipient account.

3. The method of claim 1, further comprising establishing a data share comprising the portion of web monitoring data to be shared with the recipient account.

4. The method of claim 1, wherein the identified portion of data to be shared comprises web monitoring data.

5. The method of claim 1, wherein the identified portion of data to be shared comprises data collection parameters.

6. The method of claim 1, wherein the identified portion of data to be shared comprises administrative data.

7. The method of claim 1, wherein the identified portion of data to be shared comprises web monitoring data collected by a predetermined group of web monitoring modules.

8. The method of claim 7, wherein the predetermined group of web monitoring modules includes one or more groups of web monitoring modules.

9. A technical system for sharing web monitoring data collected by a web monitoring service provider on behalf of a plurality of web monitoring accounts, the system comprising:
  a monitoring network including a plurality of monitoring servers configured to monitor a target via a data communication network to generate and store web monitoring data;
  a controlling server communicatively coupled via a data communication network with the plurality of monitoring servers in said monitoring network, the controlling server having access to said stored web monitoring data, wherein the controlling server hosts a plurality of monitoring accounts;
  a sharing module executable on the controlling server, the sharing module configured to maintain sharing data related to the plurality of monitoring accounts;

wherein the controlling server is further configured to receive a request for shared web monitoring data and grant or deny said request in accordance with said sharing data.

10. The system of claim 9, wherein the sharing module maintains a data share comprising shared web monitoring data.

11. The system of claim 10, wherein the data share comprises a set of sharing parameters that operate to facilitate sharing of web monitoring data between an owner account and a recipient account.

12. The system of claim 10, wherein the data share comprises data collection parameters.

13. The system of claim 10, wherein the data share comprises administrative data.

14. The system of claim 10, wherein the data share comprises web monitoring data collected by a predetermined group of web monitoring modules.

15. The system of claim 14, wherein the predetermined group of web monitoring modules includes one or more groups of web monitoring modules.

16. A technical system for sharing web monitoring data with a recipient account of a web monitoring service, the web monitoring data collected by the web monitoring service provider on behalf of an owner account of the web monitoring service, the system comprising:

means for monitoring a target via a communication network, said means including a plurality of monitoring servers configured to generate and store web monitoring data responsive to said monitoring of the target;

means for hosting a plurality of monitoring accounts, said means including a controlling server communicatively coupled via a data communication network with the plurality of monitoring servers;

means for maintaining sharing data collected by one or more web monitoring modules in accordance with one or more monitoring accounts;

means for determining whether to grant or deny a request for shared web monitoring data in accordance with said sharing data; and means for providing shared web monitoring data in response to said request and a determination to grant said request.

* * * * *